Dec. 28, 1943.                 C. C. QUINN                    2,338,072
                              POULTRY WATERER
                           Filed March 16, 1942
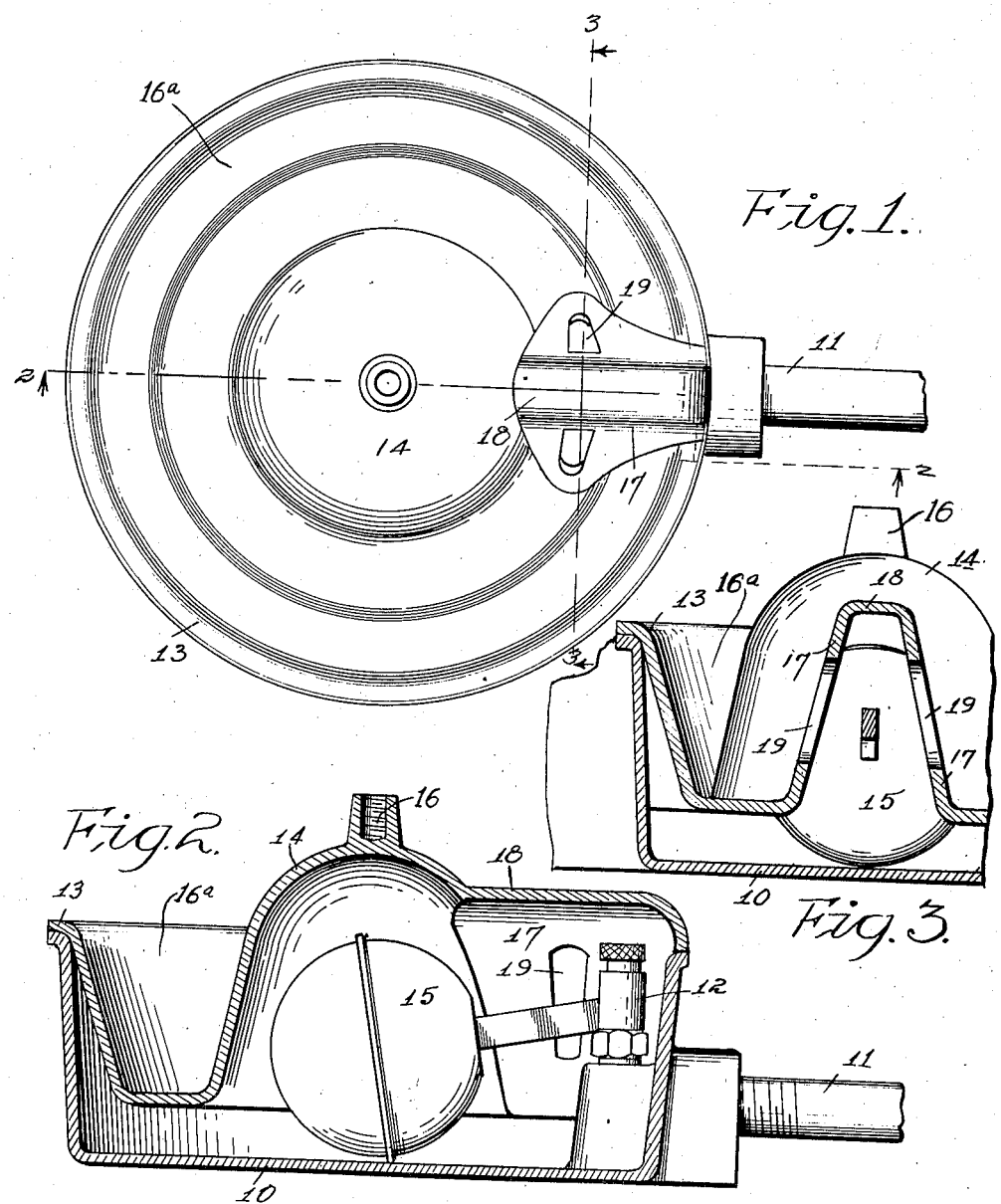
Inventor
Charles C. Quinn Patented Dec. 28, 1943

2,338,072

UNITED STATES PATENT OFFICE 2,338,072

POULTRY WATERER

Charles C. Quinn, Boone, Iowa, assignor to Quinn Wire & Iron Works, Boone, Iowa, a corporation of Iowa Application March 16, 1942, Serial No. 434,928

1 Claim. (Cl. 119—78)

My invention relates to that class of poultry waterers in which the watering trough is connected by pipe with a constant source of water supply under pressure, and the water level within the trough is maintained by a float valve.

In waterers of this class a considerable quantity of refuse from the bills of the poultry gets into the water within the trough, some of which, such as earth, is deposited on the bottom of the trough and some of which, such as grass, floats on top of the water, and since it is desirable to have clean water, this refuse must be removed at frequent intervals.

The object of my invention is to provide a main trough member having a water pipe connected to it and a float valve for the water pipe and a drinking trough loosely mounted on the main trough and adapted to collect and hold all of the refuse from the poultry's bills, and which is readily and easily removed from the main trough and from which the foreign matter, both heavier and lighter than the water, may be readily and quickly rinsed out.

In the accompanying drawing—

Figure 1 shows a top view of my improved waterer;

Figure 2 shows a vertical sectional view on the line 2—2 of Fig. 1; and

Figure 3 shows a vertical sectional view on the line 3—3 of Fig. 1 a portion of the side wall being broken away.

The main trough is indicated generally by the reference numeral 10, having a water supply pipe 11 fixed thereto and a float valve 12 for controlling the water level.

The drinking trough member is preferably cast complete in one piece and comprises an outwardly extended flange 13 at its top to rest upon the top of the main trough. At its center is an upwardly extended dome 14 to receive and cover the float ball 15. At its top is an extension 16 which serves as a convenient handle for lifting the drinking trough and also as a means for supporting a poultry guard, not shown. Between the flange 13 and the dome 14 is the trough 16a which extends down into the main trough to a distance spaced above the bottom of the main trough.

At one side of the drinking trough are two radially arranged upright walls 17 extending from the dome 14 to the outer wall of the drinking trough and having a closed top member 18. Formed in each of the walls 17 is a vertical slot 19, their lower ends being spaced above the bottom of the drinking trough, as shown in Fig. 3.

This forms a substantially circular drinking trough and cover for the ball valve device. It communicates with the water in the main trough so that a proper water level is maintained in the drinking trough at all times. When refuse from the poultry's bills enters the water in the drinking trough, the heavier particles will be deposited on the bottom of the drinking trough and will be prevented from entering the main trough because the water communicating slots are above the level of the bottom of the drinking trough, also, substantially all of the floating refuse will be kept in the drinking trough because very little could pass through the narrow slots.

In practice it has been demonstrated that with my waterer the average poultry raiser will supply his poultry with much purer water than he would with other waterers now in general use, because with my freely detachable drinking trough all that he need do is to lift it from the main trough, with its heavier refuse in the bottom and its lighter refuse floating on the water, then shake it to loosen the refuse from the bottom and rinse the drinking trough and then invert it. If not thoroughly cleaned on the first operation, he may replace it in the main tank until it is again filled with water, and repeat the rinsing operation.

In practice it has been found necessary only at long intervals to clean the main trough, and when that is necessary it may be done just as easily as with the waterers now in general use.

I claim as my invention:

A poultry waterer, comprising a main water trough, a water supply pipe communicating therewith, a float valve applied to the pipe for maintaining a constant water level, the float-ball thereof being located adjacent the center of the trough, a lever connecting the float to said valve, a drinking trough having an outer flange to rest on top of the main trough, a dome-shaped central portion to receive the float and a circular trough between them and forming a complete cover for the main trough, two spaced apart upright walls at one side of the drinking trough adapted to inclose said lever and having upright slots therein, the lower ends of the slots being spaced above the bottom of the drinking trough to thereby form a receptacle for the deposit of heavier-than-water refuse.

CHARLES C. QUINN